Nov. 10, 1931.  C. E. BOWERS  1,831,091
METAL RECOVERING APPARATUS
Filed Aug. 23, 1929   3 Sheets-Sheet 1
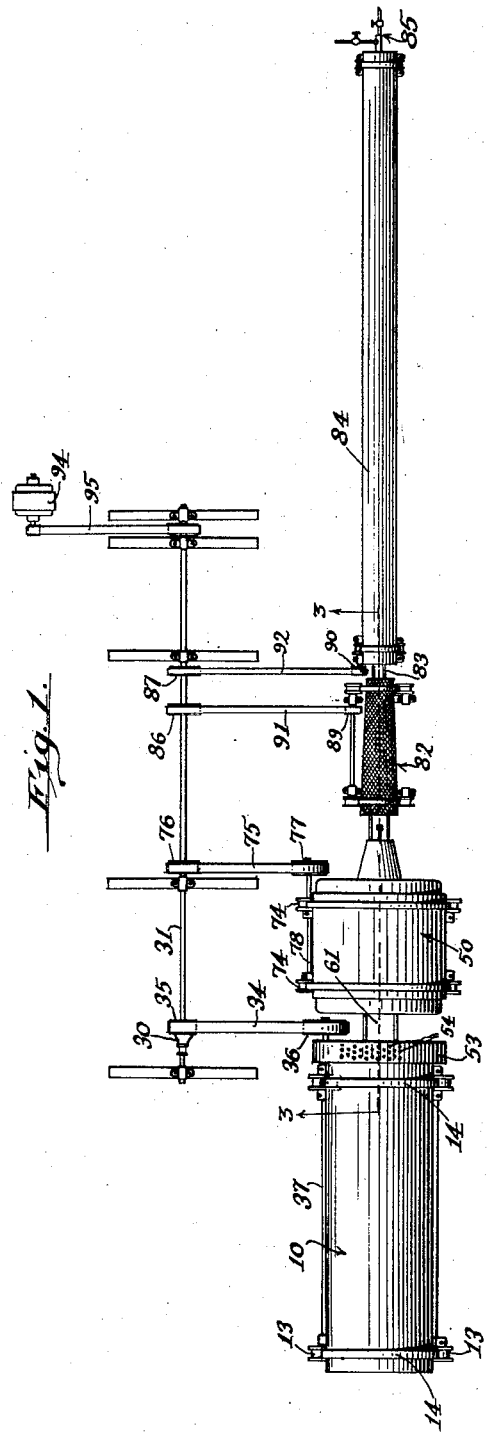
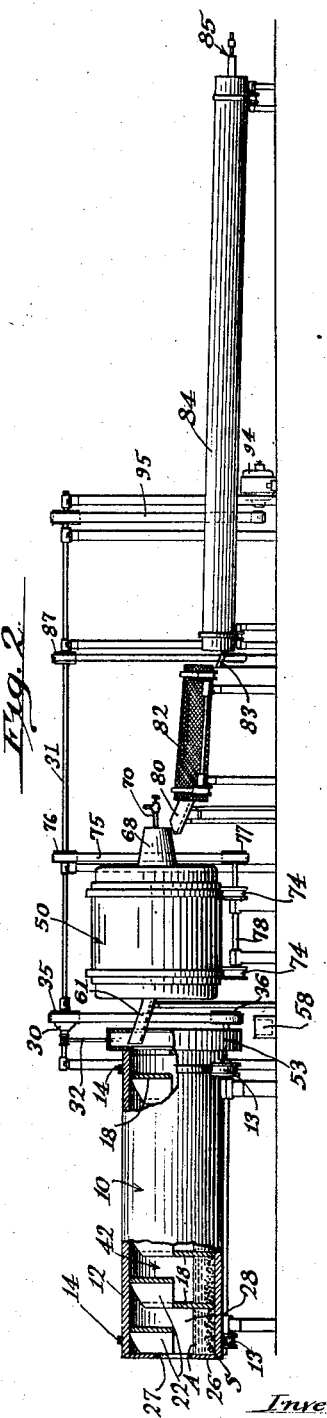
Inventor
Claude E. Bowers
Attorney

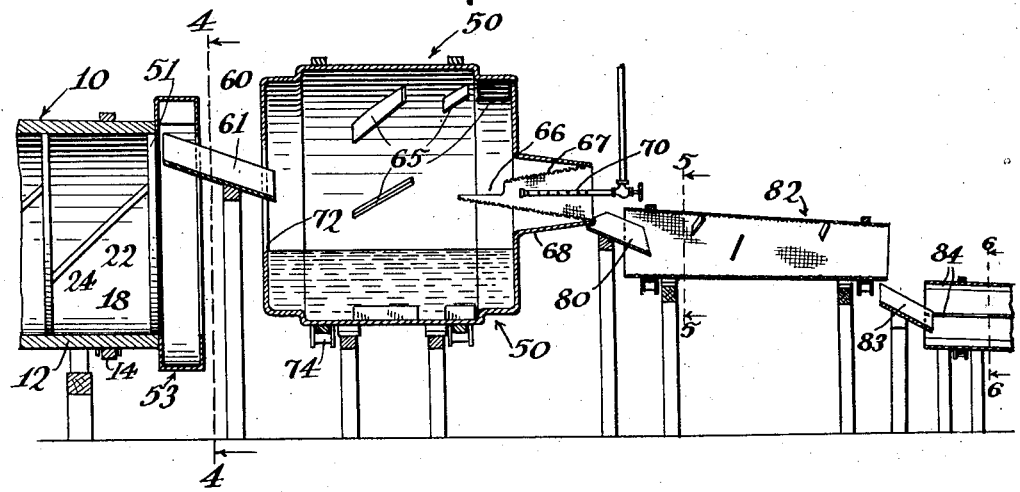
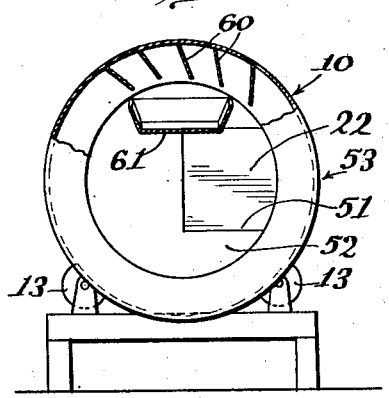
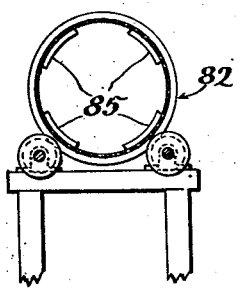
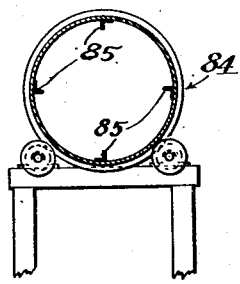

Nov. 10, 1931.  C. E. BOWERS  1,831,091
METAL RECOVERING APPARATUS
Filed Aug. 23, 1929  3 Sheets-Sheet 3
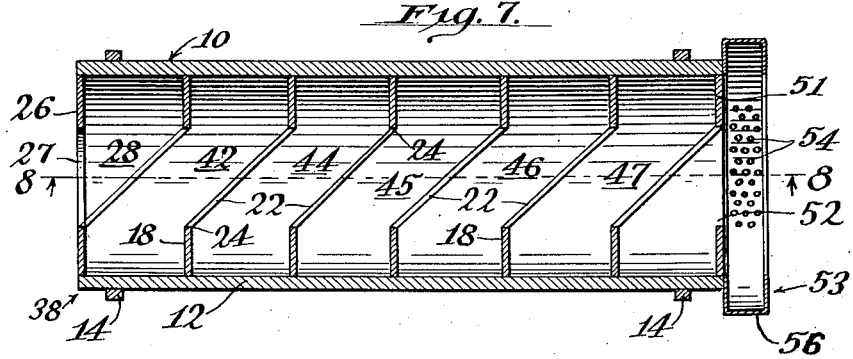
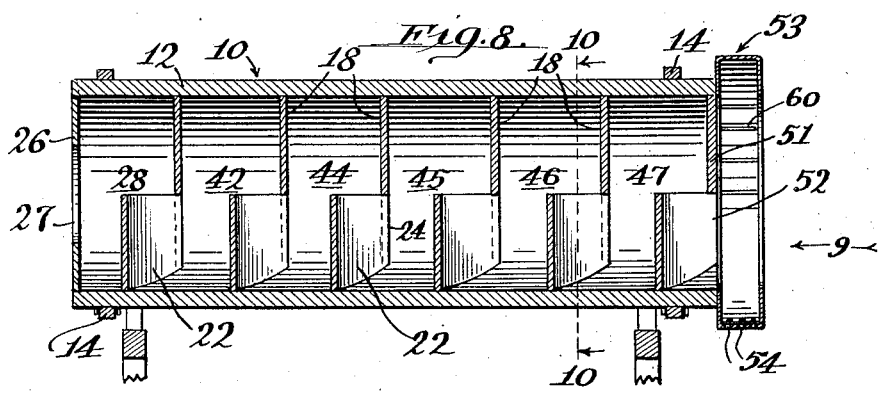
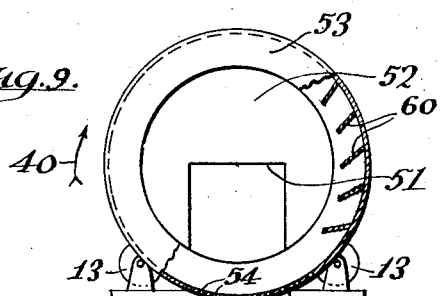
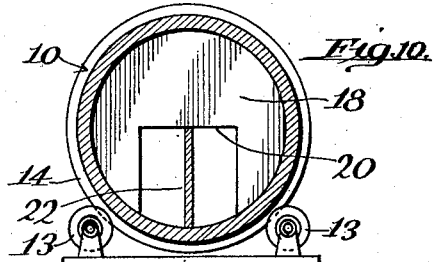
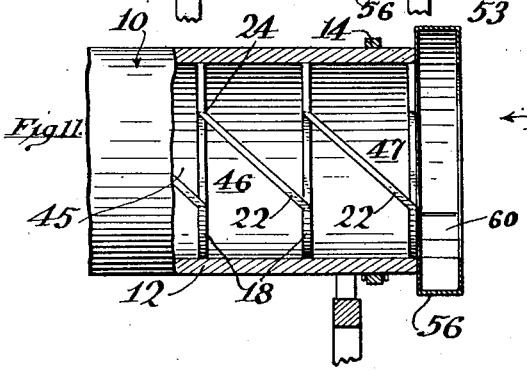
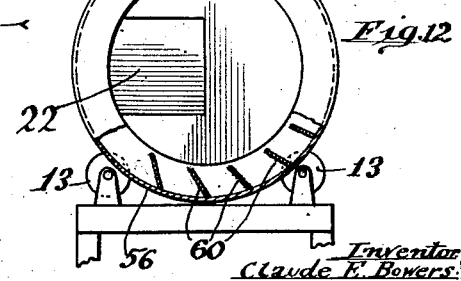

Patented Nov. 10, 1931

1,831,091

UNITED STATES PATENT OFFICE

CLAUDE E. BOWERS, OF LOS ANGELES, CALIFORNIA

METAL RECOVERING APPARATUS

Application filed August 23, 1929. Serial No. 387,962.

Metallic values estimated at thousands of tons are lost annually in galvanized iron scrap resulting from the punching or shearing operations during the manufacture of articles made from galvanized sheet iron as such scrap has no commercial value due to the coating of zinc thereon which renders it unfit for re-melting.

The chief object of this invention is to provide an apparatus for recovering the basic metallic values from plated scrap metal.

Another object of this invention is to provide an apparatus wherein galvanized iron scrap is first subjected to an acid solution bath to remove the zinc coating thereon, then cleansed with water to remove the acid therefrom, and finally dried by heat treatment.

Briefly stated the invention resides in an apparatus consisting of a rotatable drum having a plurality of compartments adapted to receive intermittent charges of a given amount of galvanized iron scrap and sulfuric acid solution in required proportions wherein the action of the acid upon the scrap removes the zinc coating thereon by pickling, the charge of scrap and acid solution being transferred from one compartment to another during each revolution of the drum, which is rotated one revolution at a time at predetermined intervals in order that the acid may have sufficient contact with the scrap to remove the coating thereon before it is discharged therefrom.

The scrap and solution are discharged from the drum and separated, the acid going to waste or to an apparatus adapted to recover the zinc values therein. The scrap is discharged from the drum into a rotating barrel wherein it is cleansed with water to remove the acid therefrom, and is discharged from the washing barrel into a revolving screen or trommel wherein the scrap is partly dried. As the scrap is discharged from the barrel into the screen it is continually sprayed with fresh water which also enters and overflows from the barrel, the fresh water entering the barrel reducing the acid content of the solution caused by any acid remaining on the surface of the scrap. The scrap is then discharged from the screen into a tubular rotating drier wherein any remaining moisture thereon is evaporated by a hot air blast as the scrap passes through the drier from one end to the other from which the finished product is finally discharged.

Referring to the drawings which illustrate a practical embodiment of the invention wherein:

Fig. 1 is a top plan view of the apparatus employed in carrying out the method stated;

Fig. 2 is a side elevation of the apparatus, parts being broken away and shown in section;

Fig. 3 is an enlarged vertical section taken on line 2—2 of Fig. 1;

Fig. 4 is a sectional view taken on line 4—4 of Fig. 3 in the direction indicated by the arrows;

Fig. 5 is a section taken through the drying screen on line 5—5 of Fig. 3;

Fig. 6 is a transverse sectional view of the tubular drier taken on line 6—6 of Fig. 3;

Fig. 7 is a horizontal sectional view taken through the drum;

Fig. 8 is a sectional view taken on line 8—8 of Fig. 7;

Fig. 9 is a view looking toward the discharge end of the drum as indicated by the arrow 9 of Fig. 8;

Fig. 10 is a transverse section through the drum taken on line 10—10 of Fig. 8;

Fig. 11 is a fragmentary side elevation partly in section of the drum showing the interior construction as it appears after one quarter revolution from the position shown in Figs. 7 and 10;

Fig. 12 is a fragmentary side elevation of the discharge end of the drum as indicated by arrow 12 of Fig. 11 parts being broken away and shown in section.

Referring by numerals to the accompanying drawings, the drum is designated at 10 and consists of a cylinder 12 rotatably carried by rollers 13 engaging bands 14 encircling the drum at each end thereof as indicated at 15. The cylinder 12 is constructed of wood or other acid-proof material and is provided with a plurality of disk shaped partition plates 18, each of which have a substantially square shaped opening 20 therein as best shown in Fig. 10. A plurality of diagonally disposed scrap transfer plates 22 are positioned between the partitions, each end of which join the partitions adjacent the openings 20 as indicated at 24 in Figs. 1 and 11, and serve to transfer the scrap from one compartment to the next during rotation of the drum.

The forward end of the drum is provided with a closure plate 26 having a circular opening 27 therein through which a charge made up of a quantity of scrap —S— and sulfuric acid solution —A— is introduced into the first compartment of the drum as designated at 28. When feeding a charge of scrap into the drum, the drum remains stationary with the diagonal transfer plates in the position shown in Fig. 2, and when in this position the scrap or solution cannot run from one compartment to another due to the openings in the partition being above the level of the solution in the drum.

The charge remains in the first compartment until the drum is given another revolution which is accomplished by shifting a clutch 30 on a line shaft 31 by a lever 32 which transmits power from the shaft to the drum by a belt 34 passing over a pulley 35 on the line shaft 31 and a pulley 36 on the shaft 37 upon which a pair of the rollers 13 are mounted.

The drum is rotated to the left when facing the forward end 38 of the drum or in the direction indicated by the arrow 40 when facing the rear or discharge end as shown in Fig. 9. Normally the clutch is disengaged and the drum remains stationary for a predetermined interval after a charge is introduced into the first compartment, the drum is then given a single revolution by shifting the clutch 30.

During rotation of the drum the solution will pass from the first compartment 28 into the next or second compartment 42 when the transfer plates reach the position shown in Figs. 7 and 8, (but cannot enter the third compartment 44 due to the position of the transfer plate at this time), and during the remainder of the revolution the scrap resting on the bottom of the drum in the first compartment will collect on the transfer plate which, due to its inclined position, will discharge the scrap therein into the second compartment when the plates reach the position shown in Figs. 11 and 12. Another charge is then fed into the first compartment and the above operations repeated the action of which carries the charge introduced into the first compartment 28 through each of the succeeding compartments designated at 44, 45, 46, and 47 at each revolution of the drum.

From the foregoing it will be seen that by introducing a charge at each revolution of the drum all of the compartments will eventually be filled, and that a charge placed in the first compartment will pass through each of the succeeding compartments during which time the acid will remove the metal coating from the scrap, the intervals between each revolution of the drum being governed by the number of compartments employed, for example it requires about thirty minutes contact with a twelve percent (12%) acid solution to remove the zinc from one hundred fifty (150) pounds scrap, hence with a drum having six compartments a lapse of six minutes is allowed between each rotation of the drum.

Thus it will be seen that by providing a drum with a greater number of compartments the period between revolutions may be reduced, for instance with a drum having twelve compartments the interval between revolutions may be reduced to one half.

Each charge of treated scrap is discharged from the drum into a rotating washing barrel designated at 50, however before the charge enters the washing barrel the solution is separated from the scrap in the following manner:

When the transfer plates reach the position shown in Figs. 7 and 8 the solution in the last compartment 47 will flow through the opening 51 in the end plate 52, into an annular trough 53 secured to the end of the drum, at which time the solution will drain through a plurality of openings 54 formed in the side wall 56 of the trough into a launder 58 which carries the solution to waste or to a treatment plant adapted to recover the zinc values in the solution.

As the drum continues to rotate the scrap will collect on the transfer plate in the last compartment which will discharge it into the trough between a plurality of baffle plates 60 which serve to carry the scrap upwardly, and when the baffle plates reach the position shown in Figs. 3 and 4 the scrap will drop into a chute 61 which carries it into the barrel.

The washing barrel 50 is of cylindrical shape and is partially filled with water and is provided with a plurality of baffle plates 65 which agitates the scrap as the barrel rotates, a portion of the scrap being continually discharged into an opening 66 formed in a conical screen 67 mounted in an extension 67 projecting from the end wall of the barrel.

The screen serves to separate or drain the water from the scrap which is continuously sprayed with fresh water issuing from a perforated pipe 70 extending into the screen, the fresh water passing through the screen and overflowing from the opposite end of the drum through an opening 72, thereby preventing the water in the barrel from becoming charged to any appreciable extent with acid as it is removed from the scrap.

Rotation of the washing barrel is accomplished by rollers 74 which engage a circular track on each end thereof, the rollers being driven by a belt 75 passing over pulleys 76 and 77 respectively on the line shaft 31 and on a shaft 78 to which the rollers are secured.

The washed scrap is discharged from the screen through chute 80 into a revolving screen or trommel 82 which serves to eliminate water remaining on the scrap as it passes therethrough, and is discharged from the screen through a chute 83 into a tubular rotating drier 84 which serves to remove any moisture remaining on the scrap.

The drier is of considerable length and is provided with a plurality of baffle plates 85 which extend throughout the length thereof, the scrap being dried as it passes through the drier by a hot air blast induced by a burner 85.

Rotation of the screen 82 and drier 84 is accomplished by pulleys 86 and 87 on the line shaft 31 and pulleys 89 and 90 on shafts having rollers engaging tracks on the screen and drier respectively, power being transmitted from the shaft 31 to the pulley by belts 91 and 92. The line shaft may be rotated by a motor 94 through a belt 95 passing over pulleys on shaft and motor.

From the construction it will be seen that charges of scrap fed into the drum 10 will pass successively through the drum, washing barrel 50, screen 82, and finally through the drier during which time all of the zinc coating thereon will have been removed from the scrap.

Although the apparatus above described is particularly adapted to remove coating from scrap resulting from punching of galvanized sheet iron in which an acid solution is employed to remove the zinc coating on the metal base, it will be readily understood that the apparatus may be employed in removing other coatings from materials of different character by employing a suitable solvent.

I claim:

1. An apparatus for removing coatings from scrap metal comprising a drum rotatably mounted, a plurality of partition plates in said drum having openings therein forming a plurality of compartments, a diagonally disposed plate in each compartment joining said partition plates, a closure plate having an opening therein through which a charge of scrap and a solvent is introduced into the first compartment of said drum, said drum adapted to be rotated one revolution at a time at predetermined intervals, a charge being introduced into the first compartment of said drum at the completion of each revolution, said diagonally disposed plates adapted to transfer the scrap from one compartment to the next through the openings in the partition plates during each revolution of said drum, whereby a charge introduced in the first compartment will pass successively through each compartment and be discharged from the last compartment, an annular trough secured to the discharge end of said drum adapted to receive charges of scrap discharged from the last compartment of said drum, said annular trough having a perforated portion through which the solvent is drained from the scrap, and a plurality of baffle plates in said annular trough adapted to elevate the scrap to a position for discharging it from the drum at each revolution.

2. An apparatus for removing coatings from scrap metal comprising a drum rotatably mounted, a plurality of partition plates in said drum having openings therein forming a plurality of compartments, baffle plates in each compartment joining the said partition plates, a closure plate having an opening therein through which a charge of scrap and a solvent is introduced into the first compartment of said drum, said drum adapted to be rotated at predetermined intervals, a charge of scrap being introduced into the first compartment of said drum at the completion of each revolution, said baffle plates adapted to transfer the scrap from one compartment to the next through the openings in the partition plates during each revolution of the drum, whereby a charge introduced into the first compartment will pass successively through each compartment and be discharged from the last compartment, an annular trough secured to the discharge end of said drum adapted to receive charges of scrap discharged from the last compartment of said drum, said annular trough having a perforated portion through which the solvent is drained from the scrap, and means in said annular trough adapted to elevate scrap to a position for discharging it from the drum at each revolution.

3. An apparatus for removing coatings from scrap metal comprising a drum rotatably mounted, a plurality of partition plates in said drum having openings therein forming a plurality of compartments, scrap transfer plates in each compartment joining the said partition plates, a closure plate having an opening therein through which a charge of scrap and a solvent is introduced into the first compartment of said drum, said drum adapted to be rotated at predetermined intervals, a charge of scrap being introduced into the first compartment of said drum at the completion of each revolution, said transfer plates adapted to transfer the scrap from one compartment to the next through the openings in the partition plates during each revolution of the drum, whereby a charge introduced into the first compartment will pass successively through each compartment and be discharged from the last compartment, and means at the discharge end of said drum adapted to elevate scrap to a position for discharging it from said drum at each revolution.

4. An apparatus for removing coatings from scrap metal comprising a drum rotatably mounted, a plurality of partition plates in said drum having openings therein forming a plurality of compartments, means in each of said compartments for transferring the scrap from one compartment to the next through the openings in the partition plates during each revolution of the drum, a closure plate having an opening therein through which a charge of scrap and a solvent is introduced into the first compartment of said drum, said drum adapted to be rotated at predetermined intervals, a charge of scrap being introduced into the first compartment of said drum at the completion of each revolution, and means at the discharge end of said drum adapted to elevate scrap to a position for discharging it from said drum at each revolution.

5. An apparatus for removing coatings from scrap metal comprising a drum rotatably mounted, a plurality of partition plates in said drum having openings therein forming a plurality of compartments, means in each of said compartments for transferring the scrap from one compartment to the next through the openings in the partition plates during each revolution of the drum, a closure plate having an opening therein through which a charge of scrap and a solvent is introduced into the first compartment of said drum, said drum adapted to be rotated at predetermined intervals, a charge of scrap being introduced into the first compartment of said drum at intervals during its revolution, and means at the discharge end of said drum for draining the surplus solvent from the scrap and elevating the same to a discharge position during a revolution of the drum.

In testimony whereof I affix my signature.

CLAUDE E. BOWERS.